United States Patent Office
3,798,253
Patented Mar. 19, 1974

3,798,253
BICYCLIC OLEFINIC POLYOXYALKYLENE POLYMERS AND SILOXANE-POLYOXYALKYLENE COPOLYMER DERIVATIVES THEREOF
Edward A. Rick, Charleston, W. Va., and George M. Omietanski, Marietta, Ohio, assignors to Union Carbide Corporation, New York, N.Y.
No Drawing. Filed Jan. 17, 1972, Ser. No. 218,595
Int. Cl. C07f 7/08
U.S. Cl. 260—448.2 B    17 Claims

ABSTRACT OF THE DISCLOSURE

This invention relates to novel polyoxyalkylene polymers characterized by certain bicyclic olefinic endblocking groups (e.g., norbornenyl end-blocking groups). The novel polymers readily undergo addition reactions with siloxanes containing SiH in the presence of chloroplatinic acid to produce novel siloxane-polyoxyalkylene block copolymers that are useful as foam stabilizers for polyurethane foams. The olefinic double bonds under go relatively little isomerization or other side reactions during such addition reactions and so the products are relatively free of materials other than the desired block copolymers.

---

Siloxane-polyoxyalkylene block copolymers have found wide acceptance as foam stabilizers in the production of polyurethane foams. One useful class of such block copolymers are those in which the blocks are linked by hydrolytically stable silicon-carbon bonds derived from the addition reaction of a siloxane containing silanic hydrogen with a linear polyoxyalkylene polymer (polyether) whose linear chain is endblocked at one end by an alkenyl group (e.g., allyl group) and at the other end by a hydroxy group, an alkoxy group or an acyloxy group. Polyoxalkylene polymers wherein the alkenyl groups are vinyl or allyl groups have been used in the latter reaction. The use of vinyl endblocked polyoxyalkylene reactants in producing the above-described block copolymers is beset by by various problems such as the tendency of the vinyl group to react with any alcoholic hydroxyls in the reaction mixture to form acetals and the tendency of the vinyl group to undergo vinyl type polymerization with the result that excess polyoxyalkylene polymer must be used to insure complete reaction of the silanic hydrogen. However, it is not practicable to separate the by-products of the side reactions from the desired block copolymer product. The presence of such by-products in the end product imposes a ceiling on the concentration of the desired block copolymer in the product. Moreover, when the desired block copolymer is intended to have a hydroxyl endblocking group on the polyoxyalkylene block (i.e., when a polyoxyalkylene reactant containing vinyl and hydroxyl endblocking groups is employed), the reaction of the vinyl groups with the hydroxyl groups (the hydroxyl groups of the reactant or of the block copolymer) reduces the hydroxyl content of the block copolymer and thereby impairs the desirable properties imparted to the block copolymer by the hydroxyl groups. In particular, the compatibility of the block copolymer in "premixtures" containing the block copolymer, a polyol, a fluorocarbon blowing agent and a catalyst is impaired. Such premixtures are used in the commercial production of rigid polyether polyurethane foams.

The use of allyl endblocked oxyalkylene polymers in the above-described addition reactions also presents some problems. Some of the allyl groups ($CH_2=CH—CH_2—$) undergo undesirable isomerization during the addition reactions to form propenyl groups ($CH_3—CH=CH—$) which are less reactive toward silanc hydrogen in the siloxane reactant than are allyl groups. To insure complete reaction of the silanic hydrogen, excess polyoxyalkylene reactant can be added to compensate for the formation of propenyl groups. However, the use of an excess of the polyoxyalkylene reactant effectively dilutes the desired block copolymer in the product. Further, the propenyl groups can enter into undersirable side reactions, such as $\equiv$SiH addition to the propenyl groups to form beta adducts. The beta adducts have less thermal stability than the alpha adducts formed in the desired SiH additions to allyl groups. A further example of the undesirable side reactions involving the propenyl groups is acetal formation by reaction of the propenyl groups with any hydroxy groups in the reaction mixture. Elimination of hydroxyl groups by the formation of acetal groups impairs the properties of the block copolymer when the block copolymer is intended to have a hydroxyl endblocking group on the polyoxyalkylene block.

It is an object of this invention to provide novel polyoxyalkylene polymers endblocked with olefinically unsaturated groups in which the olefinic double bond undergoes addition reactions with SiH, has little tendency to isomerize during such addition reactions and undergoes little, if any, side reactions during such addition reactions.

Further objects of this invention are to provide novel siloxane-polyoxyalkylene block copolymers derived from the above-mentioned novel polyoxyalkylene polymers, to provide a novel process for producing such block copolymers, and to provide a process for producing polyurethane foams employing the novel block copolymers as foam stabilizers.

This invention provides novel bicyclic olefinic polyoxyalkylene polymers having the average formula:

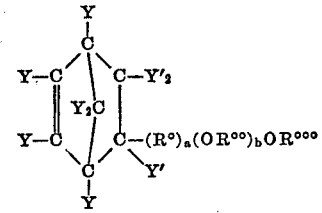

(I)

wherein Y is hydrogen or an alkyl group containing from 1 to 4 carbon atoms inclusive, Y' is hydrogen or an alkyl group containing from 1 to 12 carbon atoms inclusive, R° is a divalent hydrocarbon group free of aliphatic carbon to carbon multiple bonds, $a$ has a value of 0 or 1, R°° is an alkylene group containing at least two carbon atoms, $b$ has a value of at least 1 (perferably at least 5), R°°° is —R, —OCNHR, —OCR' or —OCOR', R is hydrogen or a monovalent hydrocarbon group free of aliphatic carbon to carbon multiple bonds (preferably an alkyl group containing from 1 to 4 carbon atoms inclusive) and R' is a monovalent hydrocarbon group free of aliphatic carbon to carbon multiple bonds (preferably an alkyl group containing from 1 to 4 carbon atoms inclusive). Preferably, $(OR°°)_b$ consists of oxyethylene groups or both oxyethylene groups and oxypropylene groups. Most preferably $b$ has a value from 20 to 60 inclusive.

This invention further provides novel siloxane-polyoxyalkylene block copolymers consisting essentially of:

(a) At least one unit having the formula:

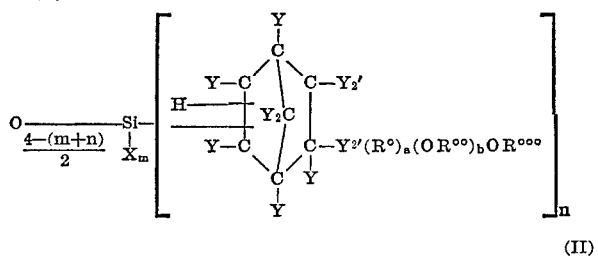

(II)

wherein X is a monovalent hydrocarbon group free of aliphatic carbon to carbon multiple bonds, $m$ has a value of 0, 1 or 2, $n$ has a value of 1 or 2 (preferably 1), $(m+n)$ has a value of 1, 2 or 3 and the remaining symbols are as defined above; and (b) Units having the formula:

(III)

wherein $p$ has a value of 1, 2 or 3 and Z is a monovalent hydrocarbon group free of aliphatic carbon to carbon multiple bonds. Preferably such copolymers contain from 1 to 25 mole-percent of units represented by Forumla II and from 25 to 99 mole-percent of units represented by Formula III.

This invention still further provides a process for producing block copolymers as defined above which process comprises reacting (1) an olefinic polyoxyalkylene polymer represented by Formula I with (2) a hydrosiloxane consisting essentially of:

(a) At least one unit having the formula:

(IV)

wherein $m$, $n$ $(m+n)$ and X are as defined above; and (b) Units having Formula III above in the presence of (3) a catalyst for the addition of SiH to olefinic bonds.

The invention also provides a method for producing a polyurethane foam by simultaneously reacting and foaming a mixture of (a) a polyester or a polyether containing at least two hydroxyl groups, (b) an organic polyisocyanate, (c) a catalyst for the reaction of (a) and (b) to produce the polyurethane, (d) a blowing agent and (e) a novel siloxane-polyoxyalkylene block copolymer as described above as a foam stabilizer.

Typical of the alkyl groups represented by Y in Formula I are the methyl, ethyl, propyl and butyl groups and typical of the alkyl groups represented by Y' in Formula I are the Y groups and the pentyl, octyl, decyl and dodecyl groups.

Typical of the monovalent hydrocarbons groups free of aliphatic carbon to carbon multiple bonds represented by R, R', X and Z in Formulas I, II, III, and IV above are the alkyl groups (for example, the methyl, ethyl, n-propyl, iso-propyl, n-butyl, sec-butyl, isobutyl, t-butyl, n-octyl, decyl, dodecyl groups), the cycloalkyl groups (for example, the cyclopropyl, cyclobutyl, cyclopentyl, cyclohexyl, cycloheptyl groups), the aryl groups (for example, the phenyl, naphthyl, phenanthrenyl, anthracenyl groups), the aralkyl groups (for example, the benzyl, 2-phenylethyl, 2-phenylpropyl, cumyl groups), the alkaryl groups (for example, the tolyl, t-butylphenyl, cyclohexylphenyl groups). X and Z are preferably methyl groups. Typical of the alkylene groups represented by R°° in Formulas I and II above are ethylene, 1,2-propylene, and 1,3-propylene and butylene. Typical of the divalent hydrocarbon groups represented by R° in Formulas I and II above are the methylene, phenylene, tolylene and R°° groups.

A preferred class of the block copolymers as defined above have the average formula:

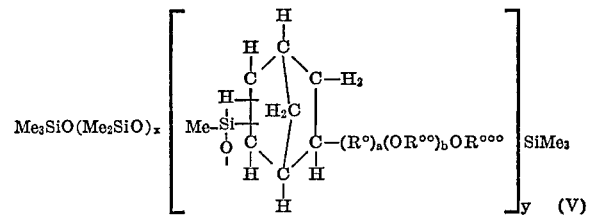

(V)

wherein Me is a methyl group, $x$ has a value from 10 to 100, $y$ has a value from 1 to 15 and the remaining symbols are defined for Formula II above. In Formula V, the free valence on the silicon atom and the free valence on the silicon-bonded oxygen atom in the unit in the brackets are part of the siloxane chain in the siloxane block in the block copolymer.

The olefinic polyoxyalkylene polymers represented by Formula I above can be produced by reacting a suitable olefinic alcohol with an alkylene oxide. Suitable olefinic alcohols are those represented by the formula:

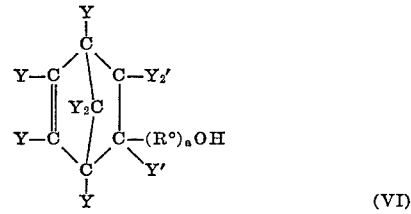

(VI)

wherein the symbols are as defined for Formula I. Suitable alkylene oxides include ethylene oxide, 1,2-propylene oxide, 1,3-propylene oxide, 1,2-butylene oxide and the like and mixtures thereof.

In general, the olefinic alcohol (starter) preferably is placed in an autoclave or other high-pressure vessel along with catalytic amounts of a suitable catalyst, such as, sodium hydroxide, potassium hydroxide, other alkali metal hydroxides, or sodium or other alkali metals. The alkylene oxide or mixture of alkylene oxides is then injected into the starter and catalyst and, the reaction being exothermic, the temperature increases, and preferably is controlled at 70 to 120° C. Because the alkylene oxides are normally gaseous materials, pressure is controlled preferably at 50 to 70 p.s.i.g. The alkylene oxide or mixture thereof is preferably injected over a period of time until the olefinic polyoxyalkylene polymer of the desired average molecular size is obtained. The rate of injection can be regulated to control the pressure and temperature within the autoclave.

When it is desired to produce an olefinic polyoxyalkylene polymer having two or more different types of oxyalkylene units in random distribution, the respective alkylene oxides are either first mixed and then injected or are separately injected simultaneously. When it is desired to produce an olefinic polyoxyalkylene polymer having blocks of different oxyalkylene units, one alkylene oxide is injected to produce a block of the desired size and then the other alkylene oxide is injected to produce its block of the desired size. This procedure can be repeated to produce more than two such blocks, as desired.

The proportions of starter and alkylene oxide used can be varied, as desired, to produce olefinic polyoxyalkylene polymers of the desired average molecular weight. The resulting compositions comprise mixtures of polyoxyalkylene polymers containing different amounts of combined alkylene oxide and thus having different molecular weights from molecule to molecule. Formulas of polyoxyalkylene polymers given herein represent average compositions.

The above-described olefinic alcohol-alkylene oxide reaction produces a hydroxyl endblocked polyoxyalkylene polymer [i.e., OR°°° in Formula I is hydroxyl]. When it is desired to produce a polymer represented by Formula I wherein OR°°° is hydrocarbonoxy, OOCNHR, OOCR' or OOCOR', the hydroxy endblocked polymer can be converted to such endblockers ("capped") by conventional means (e.g., by reaction with an alkali metal alkoxide and then with an alkyl halide to produce alkoxy endblockers, by reaction with OCNR to produce OOCNHR endblockers, etc.).

Olefinic alcohol represented by Formula VI where $a$ is 0 can be prepared using a two step process involving (1) a Diels-Alder reaction between a cyclopentadiene or alkyl substituted cyclopentadiene and an unsaturated ester of structure:

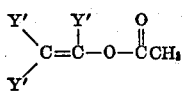

as shown by the equation:

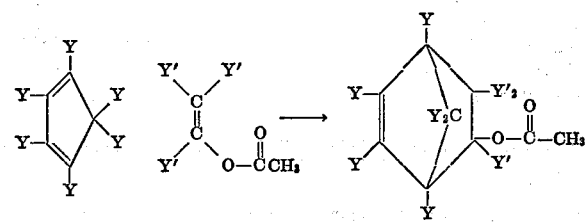

and (2) hydrolysis of the resulting ester as shown by the equation:

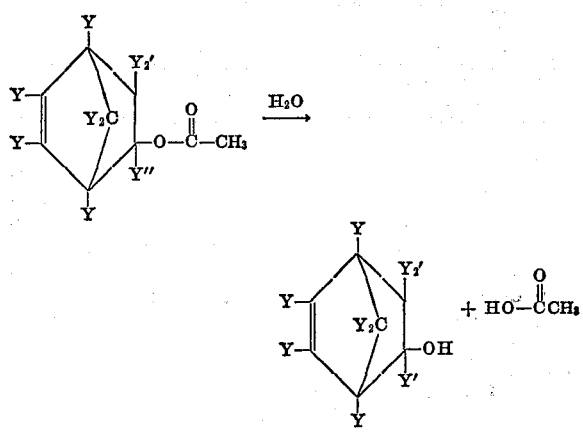

A specific example of this type of reaction sequence is illustrated below.

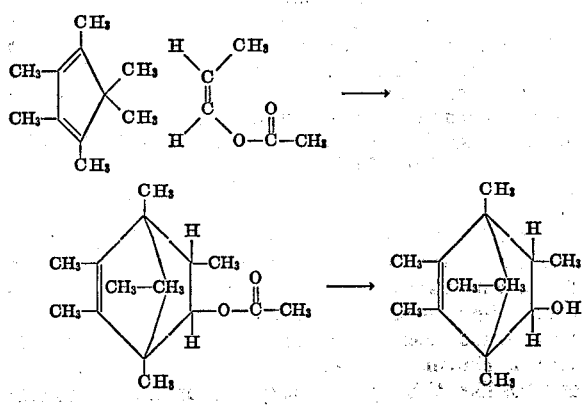

Olefinic alcohols represented by Formula VI where $a$ is 1 can be prepared by a Diels-Alder reaction between cyclopentadiene or alkyl substituted cyclopentadiene and an unsaturated alcohol of structure:

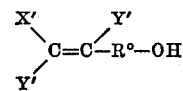

as shown by the equation:

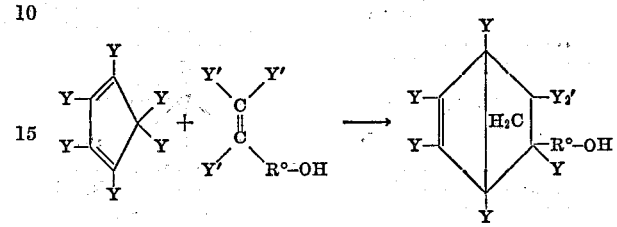

A specific example of this type of reaction is illustrated below:

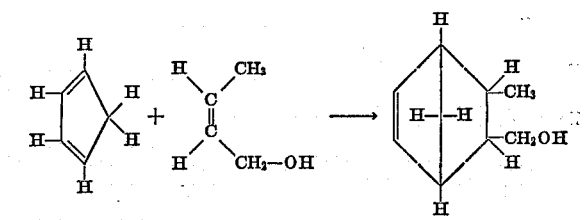

Alternatively, olefinic alcohols represented by Formula VI where $a$ is 1 can be prepared in a two step process involving (1) a Diels-Alder reaction between cyclopentadiene or alkyl substituted cyclopentadiene and an unsaturated aldehyde or ketone of structure

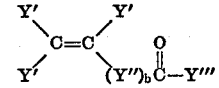

where Y″ is a divalent hydrocarbon group free of carbon to carbon multiple bonds, $b$ has a value of 0 or 1 and Y‴ is H or an alkyl group containing from 1 to 12 carbon atoms as follows:

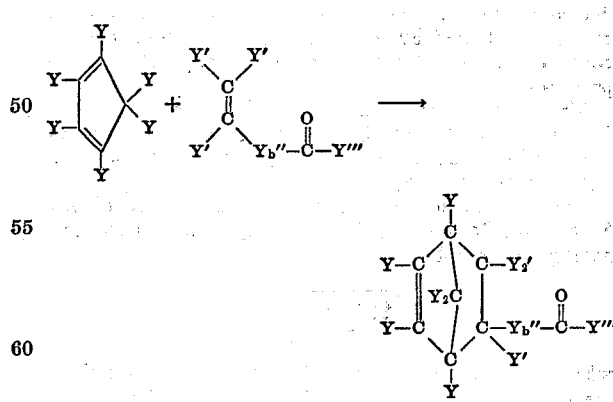

and (2) reduction of the resultant aldehyde or ketone to the corresponding alcohol as shown by the equation:

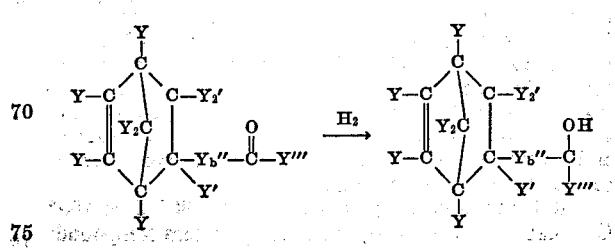

Examples of this type of reaction sequence are shown below:

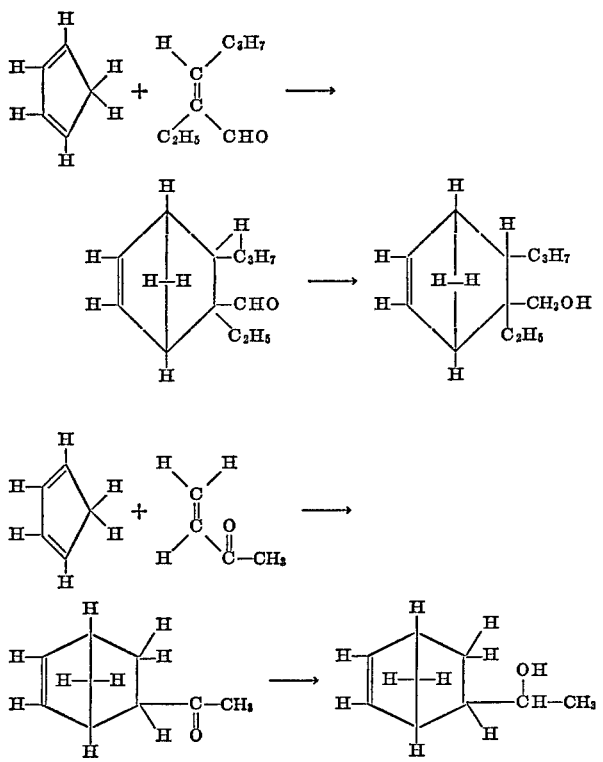

The above-mentioned reactions useful in producing olefinic alcohols represented by Formula VI can be conducted by the conventional techniques used in reactions of those general types. Thus the Diels-Alder reactions can be effected simply by maintaining a mixture of the reactants at a temperature at which they will react (e.g., from 25 to 200° C.). The hydrolysis reaction can be conducted employing a basis catalyst. The reduction reaction can be conducted by reacting a mixture containing the compound to be reduced, aluminum isopropoxide and isopropanol.

The hydrosiloxane reactants used to produce the siloxane-polyoxyalkylene block copolymers of this invention can be produced by cohydrolyzing and cocondensating the appropriate hydrolyzable silanes or by equilibrating appropriate siloxanes using conventional techniques. Such hydrosiloxanes consist essentially of at least one unit having the formula:

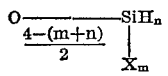

wherein $m$, $n$, $(m+n)$ and X have the above-defined meanings and units represented by Formula III above.

The process for producing the block copolymers of this invention is conducted in the same manner as used in producing known siloxane-polyoxyalkylene block copolymers by addition reactions (i.e., at elevated temperatures and in the presence of a catalyst for the addition of SiH to olefinic bonds). Approximately stoichiometric amounts of the olefinic polyoxyalkylene polymer and the hydrosiloxane (one olefinic group per silicon-bonded hydrogens) are preferred. Solvents for the polyoxyalkylene reactant and hydrosiloxane reactants (e.g., liquid hydrocarbons such as toluene) can be employed.

Suitable reaction temperatures are from 80° C. to 100° C. Suitable addition catalysts include platinum compounds (e.g., chloroplatinic acid) and complexes thereof and elemental platinum supported on charcoal or gamma alumina. Typical of the platinum catalysts that are in the form of complexes are those in which a platinum compound (e.g., a platinum chloride) has been complexed with an olefin, a pyridine compound, a thioimide, an alkyl thiourea, a phosphine or a nitrile). Amount of platinum catalysts that provide from 25 to 75 parts by weight of Pt per million parts by weight of the reactants are useful. The platinum catalysts that are soluble or dispersible in diluent can be employed in a diluent. In the case of chloroplatinic acid, a suitable diluent system is a mixture containing 50 weight percent of ethanol and 50 weight percent dimethoxyethylene glycol.

It is desirable to conduct the addition reaction at a pH between approximately 5 and approximately 7.5, particularly where the polyoxyalkylene polymer reactant contains a hydroxyl endblocking group (i.e., where R°°° in Formula I is hydrogen). If the addition reaction is conducted within the indicated pH range, the undesirable reaction of COH and SiH is reduced. To this end, it is desirable that the olefinic polyoxyalkylene polymer reactant and the hydrosiloxane reactant be treated to at least partially neutralize any non-neutral catalysts that may have been used in the production of those reactants prior to their use in producing the block copolymers. It should be noted that certain platinum catalysts (e.g., chloroplatinic catalyst) are not neutral or decompose to produce non-neutral byproducts but are nonetheless quite useful in the addition process.

The organic polyisocyanates that are useful in producing polyurethane foams in accordance with this invention are organic compounds that contain at least two isocyanato groups. Such compounds are well known in the art of producing polyurethane foams. Suitable organic polyisocyanates include the hydrocarbon diisocyanates, (e.g., the alkylene diisocyanates and the arylene diisocyanates) as well as known triisocyanates. As examples of suitable polyisocyanates one can mention 1,2-diisocyanatoethane, 1,3-diisocyanatopropane, 1,2-diisocyanatopropane, 1,4-diisocyanatobutane, 1,5-diisocyanatopentane, 1,6-diisocyanatohexane, bis(3-isocyanatopropyl)ether, bis(3-isocyanatopropyl)sulfide, 1,7-diisocyanatoheptane, 1,5-diisocyanato-2,2-dimethylpentane, 1,6-diisocyanato-3-methoxyhexane, 1,8 - diisocyanatooctane, 1,5-diisocyanato-2,2,4-trimethylpentane, 1,9-diisocyanatononane, 1,11-diisocyanatoundecane, 1,12-diisocyanatododecane, bis(isocyanatohexyl)sulfide, 1,4-diisocyanatobenzene, 2,4-diisocyanatotolylene, 2,6-diisocyanato tolylene, 1,3-diisocyanato-o-xylene, 1,3-diisocyanato-m-xylene, 1,3-diisocyanato-p-xylene, 2,4-diisocyanato-1-chlorobenzene, 2,4-diisocyanato-1-nitrobenzene, and 2,5-diisocyanato-1-nitrobenzene.

The polyesters that are useful in producing polyurethane foams in accordance with this invention are the reaction products of polyfunctional organic carboxylic acids and polyhydric alcohols. The polyesters contain at least two hydroxyl groups per molecule (as alcoholic OH or as OH in COOH groups). The functionality of these acids is preferably provided by carboxy groups (COOH) or by both carboxy groups and alcoholic hydroxyl groups. The polyesters can have hydroxyl numbers from 45 to 150 but preferably have hydroxyl numbers from 45 to 65. These hydroxyl numbers are readily determined according to the procedure described by Mitchel et al. Organic Analysis, volume I, Interscience, New York, 1953. The polyesters can be free of aliphatic carbon to carbon multiple bonds (i.e., olefinic double bonds or acetylenic triple bonds).

Typical of the polyfunctional organic carboxylic acids that can be employed in producing polyesters useful in this invention are dicarboxylic aliphatic acids such as succinic, adipic, sebacic, azelaic, glutaric, pimelic, maleic, malonic and suberic acids and aromatic dicarboxylic acids such as phthalic acid, terephthalic acid, isophthalic acid and the like. Other polycarboxylic acids that can be employed are the "dimer acids" such as the dimer of linoleic acid. Hydroxyl-containing monocarboxylic acids (such as ricinoleic acid) can also be used. Alternatively, the anhydrides of any of these various acids can be employed in producing the polyesters. Typical of the polyhydric alcohols that can be employed in producing the polyesters useful in this invention are glycerol, 1,2,6-hexanetriol, ethylene glycol, diethylene glycol, trimethylolpropane, trimethylolethane, pentaerythritol, sorbitol, propylene glycol, 1,3-butylene glycol and 1,4-butylene glycol.

The polyethers that are useful in producing polyurethane foam in accordance with this invention are exemplified by the following classes of compositions:

(a) Polyoxyalkylene polyols including alkylene oxide adducts of, for example, water, ethylene glycol, diethylene glycol, propylene glycol, dipropylene glycol, glycerol, 1,2,6-hexanetriol, 1,1,1-trimethylolethane, 1,1,1-trimethylolpropane, pentaerythritol, sorbitol, sucrose, lactose, alpha-methylglucoside, alpha-hydroxyalkylglucoside, ammonia, triethanolamine, triisopropanolamine, ethylenediamine, diethylenetriamine, novolac resins, phosphoric acid, benzenephosphoric acid, polyphosphoric acids such as tripolyphosphoric acid and tetrapolyphosphoric acid, phenolaniline, formaldehyde ternary condensation products, aniline-formaldehyde condensation products, and the like, are useful. The alkylene oxides employed in producing polyoxyalkylene polyols normally have from 2 to 4 carbon atoms. Propylene oxide and mixtures of propylene oxide with ethylene oxide are preferred.

(b) Lactone polyols prepared by reacting a lactone such as epsilon-caprolactone or a mixture of epsilon-caprolactone and an alkylene oxide with a polyfunctional initiator such as a polyhydric alcohol, an amine, or an aminoalcohol, are also useful.

(c) Phosphorus-containing derivatives such as tris(dipropylene) glycol phosphite and other phosphites are useful.

The polyether or polyester polyol (or mixture thereof) employed can have hydroxyl numbers which vary over a wide range. In general, the hydroxyl number of the polyols employed in the invention can range from about 20, and lower, to about 1000, and higher, preferably from about 30 to about 800, and more preferably, from about 35 to about 700. The hydroxyl number is defined as the number of milligrams of potassium hydroxide required for the complete neutralization of the hydrolysis product of the fully acetylated derivative prepared from 1 gram of polyol. The hydroxyl number can also be defined by the equation:

$$OH = \frac{56.1 \times 1000 \times f}{m.w.}$$

where

OH = hydroxyl number of the polyol
$f$ = average functionality, that is, average number of hydroxyl groups per molecule of polyol
m.w. = average molecular weight of the polyol.

The exact polyol employed depends upon the end-use of the polyurethane foam. The molecular weight and the hydroxyl number are selected properly to result in flexible, semi-flexible, or rigid foams. The polyol preferably possesses a hydroxyl number of from about 200 to about 1000 when employed in rigid foam formulations, from about 50 to about 250 for semi-flexible foams, and from about 20 to about 70 or more when employed in flexible foam formulations. Such limits are not intended to be restrictive, but are merely illustrative of the large number of possible combinations of the polyols that can be employed.

Foaming can be accomplished by employing a small amount of a polyurethane blowing agent, such as water, in the reaction mixture (for example, from about 0.5 to about 5 weight percent of water, based upon total weight of the reaction mixture), or through the use of blowing agents which are vaporized by the exotherm of the reaction, or by a combination of the two methods. All of these methods are known in the art. Illustrative polyurethane blowing agents include halogenated hydrocarbons such as trichloromonofluoromethane, dichlorodifluoromethane, dichloromonofluoromethane, dichloromethane, trichloromethane, 1,1-dichloro-1-fluoroethane, 1,1,2-trichloro-1,2,2-trifluoroethane, hexafluorocyclobutane, octafluorocyclobutane, and the like. Another class of blowing agents include thermally-unstable compounds which liberate gases upon heating, such as N,N'-dimethyl-N,N'-dinitrosoterephthalamide, and the like. The generally preferred method of foaming for producing flexible foams is the use of water or a combination of water plus a fluorocarbon blowing agent such as trichloromonofluoromethane. The quantity of blowing agent employed will vary with factors such as the density desired in the foamed product.

The catalysts ordinarily employed for accelerating the isocyanate-reactive hydrogen reaction can be employed in the process of this invention. Such catalysts include a wide variety of compounds such as, for example tertiary amines such as N,N-dimethyl-2-[2-dimethylaminoethoxy]-ethylamine,
trimethylamine,
N-methylmorpholine,
N-ethylmorpholine,
N,N-dimethylbenzylamine,
N,N-dimethylethanolamine,
N,N,N',N'-tetramethyl-1,3-butanediamine,
triethanolamine,
1,4-diazabicyclo[2,2,2]octane,
triethylene diamine,
bin(dimethylaminoether),
hexadecyldimethylamine, and the like. Metal-containing catalysts are not preferred when polyester polyols are used but are preferred when polyether polyols are used. Such metal catalysts include stannous octoate and dibutyltin dilaurate. The catalysts are employed in small amounts, for example, from about 0.001 weight percent to about 5 weight percent, based on weight of the reaction mixture.

The relative amounts of the various components used in the process of this invention are not narrowly critical. The polyester or polyether polyol and the polyisocyanate, taken together, are present in the foam formulations (reaction mixtures) used to produce such foams in a major amount. The relative amounts of these two components is the amount required to produce the urethane structure of the foam and such relative amounts are well known in the art. The blowing agent, catalyst and block copolymer are each present in the known amount necessary to achieve the function of the component. Thus, the blowing agent is present in a minor amount sufficient to foam the reaction mixture, the catalyst is present in a catalytic amount (i.e., an amount sufficient to catalyze the reaction to produce the urethane at a reasonable rate) and the block copolymer is present in a foam-stabilizing amount (i.e., in an amount sufficient to stabilize the foam). Thus the amount of the siloxane-polyoxyalkylene block copolymer employed as a foam stabilizer in this invention can vary over wide limits. From about 0.2 weight percent to 5 weight percent or greater of the block copolymer can be used (weight percentages are based on the total weight of the mixture, that is, the polyether or polyester polyol, polyisocyanate, catalyst, blowing agent and foam stabilizer).

Additional conventional ingredients can be employed in minor amounts in producing polyurethane foams in accordance with the process of this invention if desired for specific purposes.

In accordance with this invention, polyurethane foams are produced by the conventional procedures such as the one-step or one-shot technique wherein all of the reactants are reacted simultaneously with the foaming operation. The foaming and the urethane-foaming reaction in the one-step technique occur without the application of external heat. Thereafter, the foam can be heated (further cured) at 110° C. to 140° C. for 10 to 40 minutes to eliminate any surface tackiness if desired.

The polyurethane foams produced in accordance with this invention can be used in the same areas and for the same purposes as conventional polyester or polyether polyurethane foams (e.g., they can be used as textile interliners, cushioning materials for seating and for packaging delicate objects, and as gasketing material).

In view of the fact that the olefinic double bonds in the olefinic polyoxyalkylene polymers of this invention do not isomerize significantly during the reaction with hydrosiloxanes and do not significantly undergo side reactions, the resulting product contains a relatively high proportion of the desired copolymer. Consequently, a smaller amount of the product can be employed to achieve a given level of performance (e.g., the block copolymers are more "potent" polyurethane foam stabilizers).

In the above formulas, the symbols representing the numbers and types of groups need not the same meaning at each occurrence throughout the composition. For example, in a given block copolymer having groups represented by Formula III above, some of such groups can be dimethylsiloxane groups while other of such groups can be dimethylsiloxane groups and/or trimethylsiloxane groups.

The term "block copolymer" is used herein to denote a material wherein at least one section ("block") of the molecule is composed of recurring monomeric units of one type and at least one other section ("block") of the molecule composed of recurring monomeric units of a different type. The different sections of blocks in the molecule can be arranged in any configuration (e.g., AB, ABA, branched or cyclic). Thus the term "block copolymers" as used herein includes graft copolymers. The block copolymers used in this invention can be discrete chemical compounds. Usually, however, the block copolymers are mixtures of various discrete block copolymeric species. The block copolymers are usually mixtures due, at least in part, to the fact that the siloxane and polyoxyalkylene reactants used to produce the block copolymers are themselves usually mixtures. The block copolymers of this invention may contain small amounts of siloxane groups in addition to the groups represented by Formulas II and III above. Thus, the block copolymers can contain small amounts SiH groups (owing to incomplete reaction thereof with the polyoxyalkylene reactant) and/or Si-alkoxy or SiOH groups (owing to the incomplete hydrolysis and condensation of the silanes used to produce the hydrosiloxane reactant).

The following examples illustrate the present invention.

In the following examples the terms, abbreviations and symbols used have the indicated meanings.

and "norbornenyl"

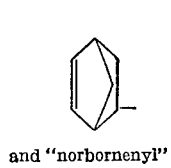
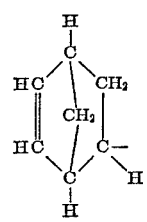

g.—grams
Me—methyl
%—percent by weight
ml.—milliliter
cstks.—centistokes
mm.—millimeters
Polyol I—A polyol produced from glycerol and a mixture of 86 weight percent propylene oxide and 14 weight percent ethylene oxide. Polyol I has a hydroxyl number of 46.
TDI—A mixture of 80 weight-percent 2,4-tolylene diisocyanate and 20 weight-percent 2,6-tolylene diisocyanate.
p.s.i.g.—pounds per square inch gauge pressure
lbs.—pounds
gal.—gallon
$\overline{M}w$—weight average molecular weight
$\overline{M}n$—number average molecular weight
Sparge—Denotes passage of an inert gas through a liquid to promote volatilization of volatile materials present in the liquid.
Strip—Denotes removal of volatile materials from a liquid, usually by maintaining the liquid at an elevated temperature and at a reduced pressure while sparging the liquid.
SUS—Saybolt Universal Seconds

EXAMPLE 1

2-hydroxymethyl norbornene (400 g.) and flake potassium hydroxide (3.0 g.) were charged to a stainless steel reactor equipped with a circulating pump. The reactor was purged with nitrogen and 1420 ml. (1205 g.) of a mixture containing 35 wt.-percent ethylene oxide and 65 wt.-percent propylene oxide were gradually fed to the reactor over a period of 4.5 hours at a temperature of 114° C. and a pressure of 65 p.s.i.g. while the contents of the reactor were circulated with the pump. Then the contents of the reactor were heated for 3 hours at about 114° C. The contents of the reactor had a hydroxyl number of 125 at this point. To 800 grams of the intermediate so produced were added an additional 9.0 grams of flake potassium hydroxide in the above reactor and an additional 4600 ml. (3405 g.) of the mixture of alkylene oxides were slowly added to the reactor at 114° C. and 60 p.s.i.g. The contents of the reactor were then heated for 5 hours at about 114° C. The contents of the reactor then had a hydroxyl number of 29.57. The contents were treated with magnesium silicate. The product was a norbornenylmethyl and hydroxyl end-blocked ethyleneoxy-propyleneoxy polymer.

The endblocking hydroxyl group of the ethyleneoxy-propyleneoxy polymer produced as described above in this example, was converted to an ONa group by reaction with sodium methylate (NaOMe) and the ONa group was in turn converted to an OMe group by reaction with methyl chloride as described below. To a 1000 ml., 3-necked round bottom flask fitted with a stirrer, thermometer, Dean-Stark trap and condenser was added 0.402 mole of the hydroxy-endblocked polymer (750 g., 0.91% OH) and 0.52 mole NaOMe (112.5 g. of a 25 weight percent NaOMe solution in MeOH) and 101.4 g. of toluene. The agitated solution was then heated to 140° C. and the toluene-methanol azeotrope and excess toluene removed by nitrogen sparging. The contents were then cooled and methyl chloride was bubbled in at 110° C. The progress of the capping was monitored by titrating timed aliquots with 0.1 normal hydrochloric acid. When no noticeable change in basicity was noted, the solution was cooled and neutralized with 2.8 ml. of acetic acid. Then, 322 g. of toluene and 124 g. of H₂O were charged to the flask and the contents of the flask were heated to 100° C. under nitrogen sparge and stirring. This solution was then transferred to a 2000 ml., 3-necked, round bottom flask equipped with a bottom take off. At this point, there was no phase separation. The flask contents were stripped of volatile materials, cooled and 340 g. of toluene and 118 ml. of a saturated NaCl solution added and the aqueous phase was separated and decanted. Residual $H_2O$ was removed azeotropically from the non-aqueous phase which was then filtered to produce a hazy liquid methoxy capped polymer product. This product was neutralized with aqueous sodium bicarbonate. The properties of the ethyleneoxy-propyleneoxy polymer before and after capping (i.e., before and after conversion of the OH endblocking group to an OMe group) were as follows:

|  | Before capping | After capping |
|---|---|---|
| Percent OH | 0.91 | 0.04 |
| Percent total unsaturation as allyl | 1.41 | 1.29 |
| Viscosity at 25° C., centistokes | 400 | 314 |
| Cloud point, ° C | 35 | 31.0 |

73.4 g. of a methyl capped and norbornenylmethyl endblocked polyoxyalkylene polymer produced as described above in this example [1.29% by weight unsaturation (as $C_3H_5$), 0.04% by weight hydroxyl, cloud point 31.0° C. and viscosity of 314 centistokes] having the average formula:

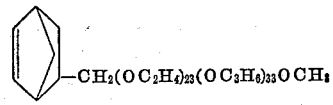
$-CH_2(OC_2H_4)_{23}(OC_3H_6)_{33}OCH_3$ was reacted at 90° C. with 26.6 g. of a hydrosiloxane having the average formula:

$$Me_3Si(O\underset{|}{Si}Me)_{5.1}(OSiMe_2)_{72}OSiMe_3(1.0SiH:1.05C=C)$$
$$\phantom{Me_3Si(O}H$$

in the presence of 43 g. of toluene solvent and 0.18 cc. of 10% solution of chloroplatinic acid dissolved in a mixture of 50 weight-percent ethanol and 50-weight-percent dimethoxy ethylene glycol (50 parts by weight of platinum per million parts by weight of reactants). In less than one hour no free SiH could be detected, indicating isomerization of norbornenyl to nortricylene was negligible. The crude reaction product was stripped and filtered. The final product had a cloud point of 36° C., a viscosity 2262 centistokes and a $\overline{Mw}$ $1.8 \times 10^4$ ($\overline{Mn}$ $7.9 \times 10^3$). This product was a block copolymer represented by the average formula:

$-CH_2(OC_2H_4)_{23}(OC_3H_6)_{33}OCH_3$ $Me_3Si(-O\underset{|}{Si})_{5.1}(OSiMe_2)_{72}OSiMe$
$\phantom{Me_3Si(-O}Me$

EXAMPLE 2

To 1.0 mole of 2-hydroxynorbornene having the formula

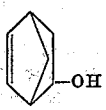
—OH is added slowly 8.0 moles of ethylene oxide under the conditions described in Example 1 (e.g., in the presence of KOH, and at 60 p.s.i.g. and 110° C.) to give norbornene endblocked polyethylene oxide having the average formula

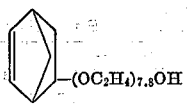
$-(OC_2H_4)_{7.8}OH$ 0.1 mole of the norbornene endblocked polyethylene oxide polymer produced as described above in this example is mixed with sufficient hydrochloric acid so that the pH of a 10% aqueous solution of the polymer is about 5.5. This is done to minimize the SiH+COH reaction in the next step. The acidified polymer is reacted with 0.016 mole of a hydrosiloxane having the average formula:

$Me_3SiO(Me_2SiO)_{50}(C_6H_5C_2H_4SiMeO)_9(MeHSiO)_6SiMe_3$ in the presence of 40 ml. of toluene and 0.21 cc. of 10% chloroplatinic acid (50 parts of weight of platinum per million parts by weight of reactants) at a temperature from 80 to 100° C. to give the block copolymer represented by the average formula:

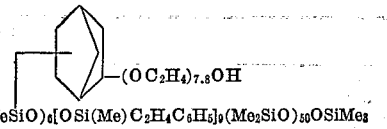
$-(OC_2H_4)_{7.8}OH$ $Me_3SiO(Me_2SiO)_6[OSi(Me)C_2H_4C_6H_5]_9(Me_2SiO)_{50}OSiMe_3$

EXAMPLE 3

2-hydroxymethyl norbornene was used as a starter in producing an olefinic polyoxyalkylene polymer in a two step process under pressure. The first step involved reacting the 2-hydroxymethyl norbornene (which had been prereacted with potassium) with an alkylene oxide mixture containing 42 weight-percent ethylene oxide and 58 weight-percent propylene oxide. The product of the first step was reacted with an additional portion of the alkylene oxide mixture in the second step. In both steps, the alkylene oxide mixture was slowly fed into a reactor containing the other reactant. The reaction details were as follows:

FIRST STEP

Charge:
| | |
|---|---|
| 2-hydroxymethyl norbornene containing potassium, grams [a] | 411 |

Feed data:
| | |
|---|---|
| Mixture of alkylene oxides, grams | 1214 |
| Temperature, ° C. | 100 |
| Pressure, p.s.i.g. (maximum) | 50 |
| Feed time, hours | 1.5 |
| Heating after feed, hours | 1.5 |

SECOND STEP

| | |
|---|---|
| Charge—First step product, grams | 805 |

Feed data:
| | |
|---|---|
| Mixture of alkylene oxides, grams | 4092 |
| Temperature, ° C. | 104 |
| Pressure, p.s.i.g. (maximum) | 55 |
| Feed time, hours | 12 |
| Heating after feed, hours | 6 |

Analysis of refined product [b]:
| | |
|---|---|
| Hydroxyl number | 20.96 |
| Average molecular weight | 2676 |
| Percent hydroxyl (wt.-percent) | 0.635 |
| Unsaturation, percent allyl (wt.-percent) | 1.26 |
| Viscosity, SUS at 100° F. | 1320 |

[a] Starter was prepared by drying 2-hydroxymethyl norbornene over molecular selve to 0.01 percent water content. The dry material was then reacted with metallic potassium to a catalyst concentration of 2.74 percent as potassium hydroxide.
[b] Refined by neutralization and filtration.

The product had the average formula:

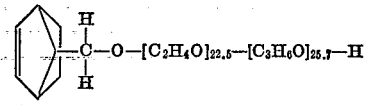
$-\underset{|}{\overset{|}{C}}-O-[C_2H_4O]_{22.5}-[C_3H_6O]_{25.7}-H$ The olefinic polyoxyalkylene polymer produced as described above in this example was capped as follows:

To a 3000 ml., 3 neck flask, equipped with a stirrer, thermometer, reflux condenser and vacuum equipment, charge 1000 grams of the polyoxyalkylene polymer and 106 grams of sodium methoxide (25% solution in MeOH). Heat with stirring to 55–60° C. temperature range and pull 10 mm. of Hg vacuum on the system for 4 hours. After 4 hours have elapsed, release vacuum and add MeCl (gas) through a sparge tube. Follow the disappearance of Na salt by titrating aliquots with 0.1 N HCl at 30 ml. intervals. Upon completion of MeCl addition charge 30 wt.-percent toluene (400 g.) to the reaction mixture. Charge water (330 g.) to the reaction mixture and agitate for 30 minutes. Decant water phase and sparge organic phase with $N_2$ at 130° C. to remove retained $H_2O$ and toluene. The product was cooled, neutralized with aqueous $NaHCO_3$, was filtered and had the following analysis.

| | Before capping | After capping |
|---|---|---|
| Percent OH | 0.64 | (1) |
| Percent allyl | 1.26 | 1.26 |
| Viscosity (centistokes at 25° C.) | 601 | 431 |
| Cloud point, ° C. | 41 | 38 |

[1] Not detectable.

Into a 3 neck, 250 ml. flask, weigh 37.0 grams of the capped polyoxyalkylene polymer produced as described above in this example (5% molar excess), 11.6 grams of an SiH fluid having the average formula:

$$Me_3SiO(Me_2SiO)_{72}(MeSiHO)_{5.1}SiMe_3$$

and 21.0 grams of toluene. Heat with stirring to 60° C. and charge 50 parts per million of platinum in the form of $H_2PtCl_6 \cdot 6H_2O$. Continue heating and controlling the maximum flask temperature at 90° C. Measure SiH via an alcoholic KOH fermentation tube technique until SiH is non-detectable (no evolution of $H_2$). Remove toluene by nitrogen sparge at 130° C. Cool, and filter. The block copolymer so produced the average formula:

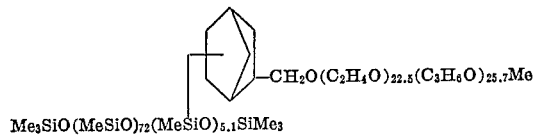

$Me_3SiO(MeSiO)_{72}(MeSiO)_{5.1}SiMe_3$

EXAMPLE 4

Following the two step procedure of Example 3, an olefinic polyoxyalkylene polymer was produced from 2-hydroxy methyl norbornene and an alkylene oxide mixture containing about 50 weight percent ethylene oxide and 50 weight percent propylene oxide. The reactive details were as follows:

FIRST STEP

Charge—2-hydroxymethyl norbornene containing potassium, grams _____ 420
Feed data:
  Mixture of alkylene oxides, grams _____ 1242
  Temperature, ° C. _____ 100
  Pressure, p.s.i.g. (maximum) _____ 50
  Heating after feed, hours _____ 2.0

SECOND STEP

Charge—First step product, grams _____ 800
Feed data:
  Mixture of alkylene oxides, grams _____ 3803
  Temperature, ° C. _____ 104
  Pressure, p.s.i.g. (maximum) _____ 50
  Feed time, hours _____ 10
  Heating after feed, hours _____ 4

Analysis of refined sample:
  Hydroxyl number _____ 20.21
  Average molecular weight _____ 2775
  Percent hydroxyl (wt.-percent) _____ 0.612
  Unsaturation, percent allyl (wt.-percent) ____ 1.28
  Viscosity, SUS at 100° F. _____ 1482

The product had the average formula:

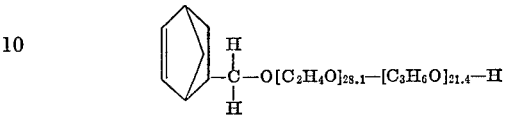

The olefinic polyoxyalkylene polymer produced as described above in this example was capped as described in Example 3 above. The results were as follows:

| | Before capping | After capping |
|---|---|---|
| Percent OH | 0.61 | (1) |
| Percent allyl | 1.26 | 1.26 |
| Viscosity (centistokes at 25° C.) | 667 | 483 |
| Cloud point, ° C. | 53 | 51 |

[1] Not detectable.

The capped polyoxyalkylene polymer produced as described above was converted to a block copolymer using the procedure and SiH reactant described in Example 3 above. The block copolymer had the average formula:

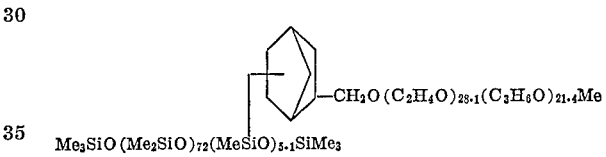

$Me_3SiO(Me_2SiO)_{72}(MeSiO)_{5.1}SiMe_3$

EXAMPLE 5

Two series of polyurethane foams were produced at two different block copolymer concentrations from the following formulation:

Material: Parts by weight
  Polyol I _____ 100.
  Distilled water _____ 4.85.
  Dimethylethanolamine _____ 0.35.
  $CCl_3F$ _____ 15.0.
  Stannous octoate _____ 0.3.
  TDI _____ 105 index.
  Block copolymer _____ 0.44 (Series I) or 0.64 (Series II).

The foams were produced by adding the copolymer to the Polyol I in a 1000 ml. container, mixing with a spatula, adding a mixture of the water and the amine to the container, adding the $CCl_3F$ to the container, mixing in a drill press for 15 seconds, adding the stannous octoate, mixing for 8 seconds in a drill press, adding the TDI, mixing in a drill press for 7 seconds, pouring the formulation into a mold and curing for 15 minutes at 135° C. Prior to the cure, the temperature of the materials was maintained at no higher than 25° C. The properties of the block copolymers used and the foams produced are tabulated below.

| | Block copolymer properties | | Foam properties | | | | | |
|---|---|---|---|---|---|---|---|---|
| | | | Series I[a] | | | Series II[b] | | |
| Block copolymer of example | Viscosity at 25° C. (cst.) | Cloud point (° C.) | Rise (Inches) | Cells per inch | N.B.[c] | Rise (Inches) | Cells per inch | N.B.[c] |
| 1 | 2,262 | 36 | 5.8 | Collapse | | 11.4 | 36 | 2.0 |
| (d) | 7,115 | 42 | 11.9 | 32 | 6.7 | 12.7 | 34 | 4.7 |
| 3 | 8,998 | 42 | 12.4 | 32 | 6.0 | | | |
| 4 | 27,502 | 51 | 12.4 | 16 | 1.0 | 12.6 | 16 | 0.75 |

[a] 0.44 parts block copolymer per 100 parts Polyol I.
[b] 0.64 parts block copolymer per 100 parts Polyol I.
[c] Nopco breathability.
[d] Repeat of Example 3 but 24% excess of the polyoxyalkylene reactant used.

In the production of the block copolymers of this invention by the addition process described above, it is theoretically possible for the silicon atom in the SiH group of the hydrosiloxane reactant to become attached to either of the carbon atoms of the olefinic group (—YC=CY—) in the bicyclic ring of the polyoxyalkylene polymer reactant. In actuality, a mixture of both isomers is probably formed. In the formulas for the block copolymers appearing above, the attachment of the silicon atom to the bicyclic ring is shown in a manner which covers both isomers.

In the production of the block copolymers of this invention, relatively little isomerization of the olefinic group in the bicyclic ring of the polyoxyalkylene reactant occurs. For example, when the bicyclic ring is norbornenyl, no more than 5 mole percent of such groups isomerize to nortricyclenyl during the reaction. This is a marked improvement over the results obtained using conventional allyl endblocked polyoxyalkylene polymer reactants. With the latter reactants, about 10 to 20 mole percent of the allyl groups isomerize to propenyl groups during the chloroplatinic acid-catalyzed reaction with hydrosiloxanes.

In the examples appearing above, the total unsaturation in the polyoxyalkylene polymers was measured by the conventional mercuric acetate method. The results of those measurements were arbitrarily reported as weight percent allyl groups although it is recognized that the unsaturation is actually present in the polymers in norbornenyl groups.

The hydrosiloxane reactants employed in the foregoing examples were produced by equilibrating a dimethyldichlorosiloxane hydrolyzate (consisting of a mixture of dimethylsiloxanes), hexamethyl disiloxane and a trimethylsiloxy endblocked poly(methylhydrogensiloxane) in the presence of a catalytic amount of sulfuric acid followed by neutralizing the equilibrate with sodium bicarbonate.

The formulas —OCNHR, —OCR' and —OCOR' used herein can be alternatively written as

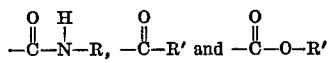

respectively.

What is claimed is:
1. A siloxane-polyoxyalkylene block copolymer consisting essentially of:
(A) at least one unit having the formula:

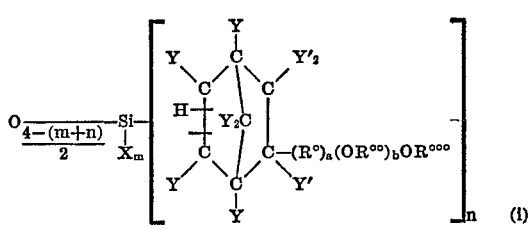

wherein X is a monovalent hydrocarbon group free of aliphatic carbon to carbon multiple bonds, $b$ has a value of at least 1, $m$ has a value of 0, 1 or 2, $n$ has a value of 1 or 2 and $(m+n)$ has a value of 1, 2 or 3, Y is hydrogen or an alkyl group containing from 1 to 4 carbon atoms inclusive, Y' is hydrogen or an alkyl group containing from 1 to 12 carbon atoms inclusive, R° is a divalent hydrocarbon group free of aliphatic carbon to carbon multiple bonds, $a$ has a value of 0 or 1, R°° is an alkylene group containing at least two carbon atoms, R°°° is —R, —OCNHR, —OCR' or —OCOR', R is hydrogen or a monovalent hydrocarbon group free of aliphatic carbon to carbon multiple bonds and R' is a monovalent hydrocarbon group free of aliphatic carbon to carbon multiple bonds, and (B) units having the formula:

$$Z_pSiO_{\frac{4-p}{2}} \qquad (ii)$$

wherein Z is a monovalent hydrocarbon group free of aliphatic carbon to carbon multiple bonds and $p$ has a value of 1, 2 or 3.

2. A block copolymer as defined in claim 1 wherein each Y and each Y' is hydrogen and $a$ is 0.

3. A block copolymer as claimed in claim 1 wherein each Y and each Y' is hydrogen, $a$ is 1 and R° is methylene.

4. A block copolymer as defined in claim 2 wherein each X and each Z is a methyl group.

5. A block copolymer as defined in claim 3 wherein each X and each Z is a methyl group.

6. A block copolymer as claimed in claim 4 wherein $b$ has a value of at least 5.

7. A block copolymer as claimed in claim 5 wherein $b$ has a value of at least 5.

8. A block copolymer as claimed in claim 6 wherein R°°° is hydrogen.

9. A block copolymer as claimed in claim 7 wherein R°°° is hydrogen.

10. A block copolymer as claimed in claim 6 wherein R°°° is alkyl.

11. A block copolymer as claimed in claim 7 wherein R°°° is alkyl.

12. A block copolymer as defined in claim 1 having the average formula:

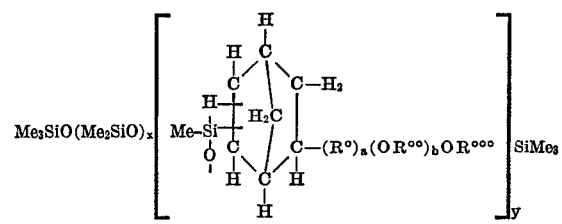

wherein Me is a methyl group, $x$ has a value from 10 to 100, $y$ has a value from 1 to 15 and the remaining symbols are as defined in claim 1.

13. A process for producing a block copolymer as defined in claim 2 which process comprises reacting: (1) an olefinic polyoxyalkylene polymer having the average formula:

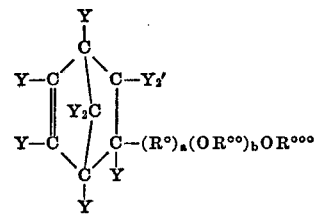

wherein the symbols are as defined in claim 1; with (2) a hydrosiloxane consisting essentially of:
(a) at least one unit having the formula:

the symbols are as defined in claim 1; and
(b) units represented by Formula II of claim 2 in the presence of (3) a catalyst for the addition of SiH to olefinic bonds.

14. A process as claimed in claim 13 wherein the catalyst is a platinum catalyst.

15. A process as claimed in claim 13 wherein the catalyst is chloroplatinic acid.

16. A process as claimed in claim 13 wherein (1) is present in an amount that provides about one olefinic double bond per silicon-bonded hydrogen in (2).

17. A siloxane-polyoxyalkylene block copolymer consisting essentially of:

(A) at least one unit having the formula:

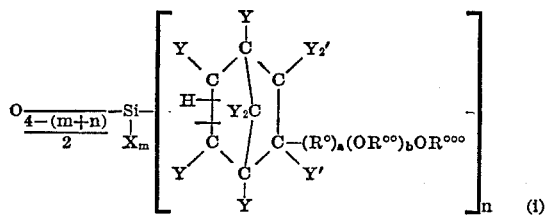

wherein X is a methyl group, $m$ is 1 or 2, $n$ is 1, Y and Y' are hydrogen, R° is methylene, $a$ is 0 or 1, $(OR^{\circ\circ})_b$ consists of oxyethylene groups or both oxyethylene groups and oxypropylene groups, $b$ has a value from 20 to 60 inclusive, $R^{\circ\circ\circ}$ is hydrogen or alkyl group containing from 1 to 4 carbon atoms inclusive and $p$ has a value of 2 or 3; and (B) units having the formula:

wherein Z is a methyl group and $p$ has a value of 1, 2 or 3.

References Cited

UNITED STATES PATENTS

| | | | |
|---|---|---|---|
| Re. 25,727 | 2/1965 | Haluska | 260—448.2 B |
| 3,686,254 | 8/1972 | Morehouse | 260—448.2 B |
| 3,505,377 | 4/1970 | Morehouse | 260—448.2 B |
| 3,657,305 | 4/1972 | Morehouse | 260—448.2 B |
| 3,398,104 | 8/1968 | Haluska | 260—448.2 B X |

DANIEL E. WYMAN, Primary Examiner

P. F. SHAVER, Assistant Examiner

U.S. Cl. X.R.

260—2.5 AM, 46.5 Y, 448.2 E, 467, 557 R, 611 R, 611 B